(12) United States Patent
Kollaritsch et al.

(10) Patent No.: US 8,707,228 B1
(45) Date of Patent: Apr. 22, 2014

(54) METHOD AND SYSTEM FOR IMPLEMENTING HIERARCHICAL PROTOTYPING OF ELECTRONIC DESIGNS

(75) Inventors: Paul W. Kollaritsch, Nacogdoches, TX (US); Ping-Chih Wu, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/097,818

(22) Filed: Apr. 29, 2011

(51) Int. Cl.
*G06F 17/50* (2006.01)

(52) U.S. Cl.
USPC ........... 716/106; 716/108; 716/118; 716/119; 716/122; 716/124; 716/100; 716/101; 716/103; 716/104; 716/105; 716/125; 716/132; 716/134

(58) Field of Classification Search
USPC ......... 716/118–119, 100–101, 103–106, 108, 716/122, 124, 125, 132, 134
See application file for complete search history.

(56) References Cited

U.S. PATENT DOCUMENTS

| | | | |
|---|---|---|---|
| 6,496,972 B1 * | 12/2002 | Segal | 716/103 |
| 6,874,135 B2 * | 3/2005 | Gupta et al. | 716/108 |
| 7,380,233 B2 * | 5/2008 | Bickford et al. | 716/136 |
| 7,603,643 B2 | 10/2009 | McCracken et al. | |
| 7,802,215 B2 | 9/2010 | Reddy et al. | |
| 8,095,898 B1 | 1/2012 | Wu et al. | |
| 8,122,398 B2 * | 2/2012 | Veller et al. | 716/103 |
| 8,181,145 B2 * | 5/2012 | Rice et al. | 716/134 |
| 2003/0237067 A1 * | 12/2003 | Mielke et al. | 716/6 |
| 2006/0031699 A1 | 2/2006 | Arthanari et al. | |
| 2006/0053395 A1 | 3/2006 | Lai et al. | |
| 2007/0277144 A1 * | 11/2007 | Veller et al. | 716/18 |
| 2009/0013298 A1 * | 1/2009 | Fouad et al. | 716/11 |
| 2009/0210840 A1 | 8/2009 | Berry et al. | |
| 2012/0124534 A1 * | 5/2012 | Kalafala et al. | 716/108 |
| 2013/0061193 A1 | 3/2013 | Lasher et al. | |

OTHER PUBLICATIONS

Hierarchical Scan Synthesis Methodology Using Test Models, Synopsys, Oct. 2001, 8 Pages.
Non-Final Office Action dated Aug. 6, 2013 for U.S. Appl. No. 13/632,138.
Notice of Allowance dated Dec. 13, 2013 for U.S. Appl. No. 13/632,138.

* cited by examiner

*Primary Examiner* — Stacy Whitmore
(74) *Attorney, Agent, or Firm* — Vista IP Law Group, LLP

(57) ABSTRACT

Disclosed are improved methods, systems, and computer program products for implementing flexible models to perform efficient prototyping of electronic designs, which allows for very efficient analysis of the electronic designs. The flexible models allow many of the existing tools for designing electronics to perform more efficiently.

40 Claims, 16 Drawing Sheets

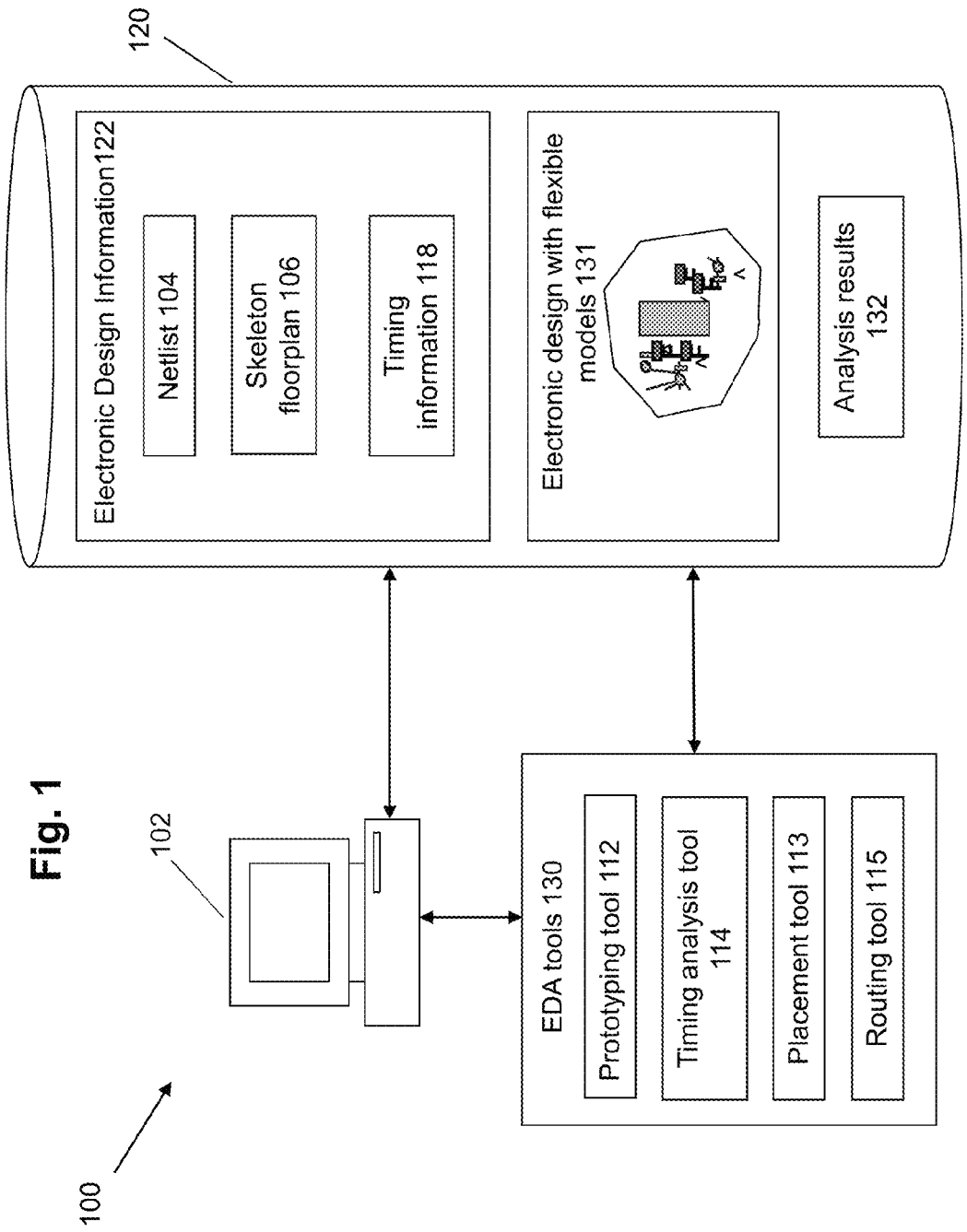

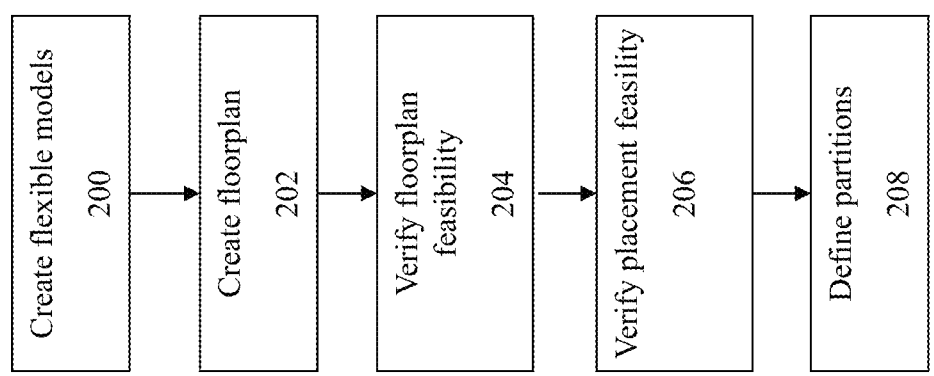

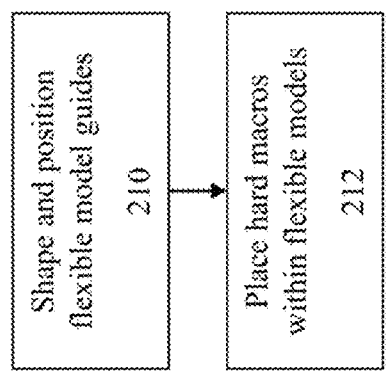

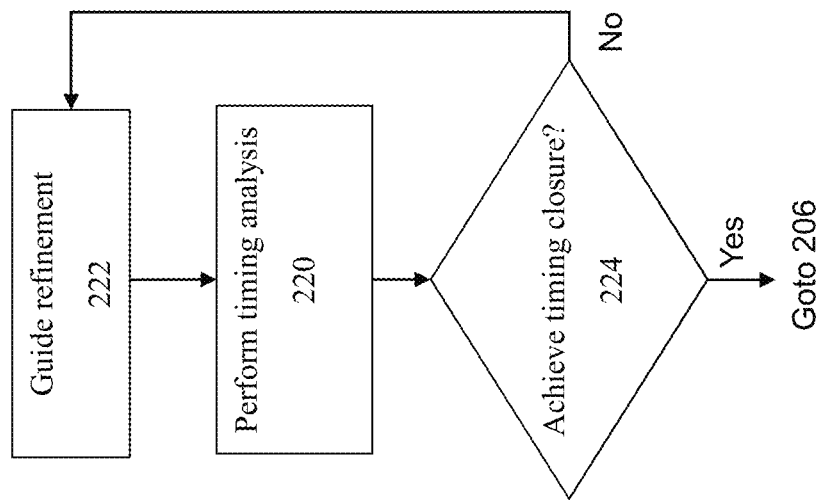

402

400

METHOD AND SYSTEM FOR IMPLEMENTING HIERARCHICAL PROTOTYPING OF ELECTRONIC DESIGNS

BACKGROUND

The invention is directed to an improved approach for implementing prototyping and analysis of electronic circuit designs.

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

The EDA tools may be used to perform early stage analysis and examinations of an electronic design. For example, the EDA tools may be used to determine whether the electronic design is capable of meeting timing requirements along signal paths in the design. Failure of a design to adequately meet timing requirements could result in an electronic product that may fail under usage and/or not function according to its intended purpose. Therefore, for design and planning purposes, it is very desirable for engineers and designers to be able to obtain an early-stage estimate of the likelihood that a particular design will meet its timing requirements. Early identification of timing problems allows the designer to address the timing identified issues in a much more efficient way than if such timing problems are discovered later in the design cycle.

One possible approach to address this problem of early timing analysis is to employ a pure top-down timing budget analysis. In this approach, prototyping or modeling of the circuit design is used to perform timing analysis on the circuit, in which budgeting and partitioning of the circuit is performed in a top-down manner such that each portion of logic is given a specified percentage/portion of the virtual timing budget based upon a top-down guess and/or expected need regarding the timing needs for each logic portion. Block and full chip implementations would then occur to perform analysis of the timing results, with the process looping back to the budgeting and partitioning steps once it is discovered that the earlier budgeting/partitioning corresponds to expected timing problems. This cycle repeats itself until the expected timing results meets the requirements fro the designer. One problem with this approach is that conventional modeling and prototyping techniques causes this process to take an excessive amount of time and computing resources, particularly given the large number of objects and features that exist on modern electronic designs. In addition, conventional top-down modeling and prototyping approaches can fail to identify timing errors at an early stage of the design cycle, such that timing problems are only identified once the analysis has returned to the top level. This can be caused, in part, by unrealistic time budgeting that is imposed during the modeling and analysis process.

Therefore, there is a need for an improved approach to implement prototyping and/or modeling for electronic designs that allows for efficient analysis of the electronic designs. There is also a need for an improved and more efficient approach to perform early-stage timing analysis upon the electronic designs.

SUMMARY

Embodiments of the present invention provide an improved method, system, and computer program product for implementing flexible models to perform efficient prototyping of electronic designs, which allows for very efficient analysis of the electronic designs. Some embodiments of the invention pertain to usage of the flexible abstraction models to more efficiently perform timing analysis upon the electronic designs. The invention therefore allows greater analysis efficiency with regards to timing analysis and physical analysis (e.g., congestion analysis, placement analysis, and/or partition analysis).

Other additional objects, features, and advantages of the invention are described in the detailed description, figures, and claims.

BRIEF DESCRIPTION OF FIGURES

FIG. 1 depicts an architecture of a system for performing hierarchical prototyping using flexmodels according to some embodiments of the invention.

FIGS. 2A-F provide flowcharts of one or more approaches for performing hierarchical prototyping using flexmodels according to some embodiments of the invention.

DETAILED DESCRIPTION

Figure 2D:
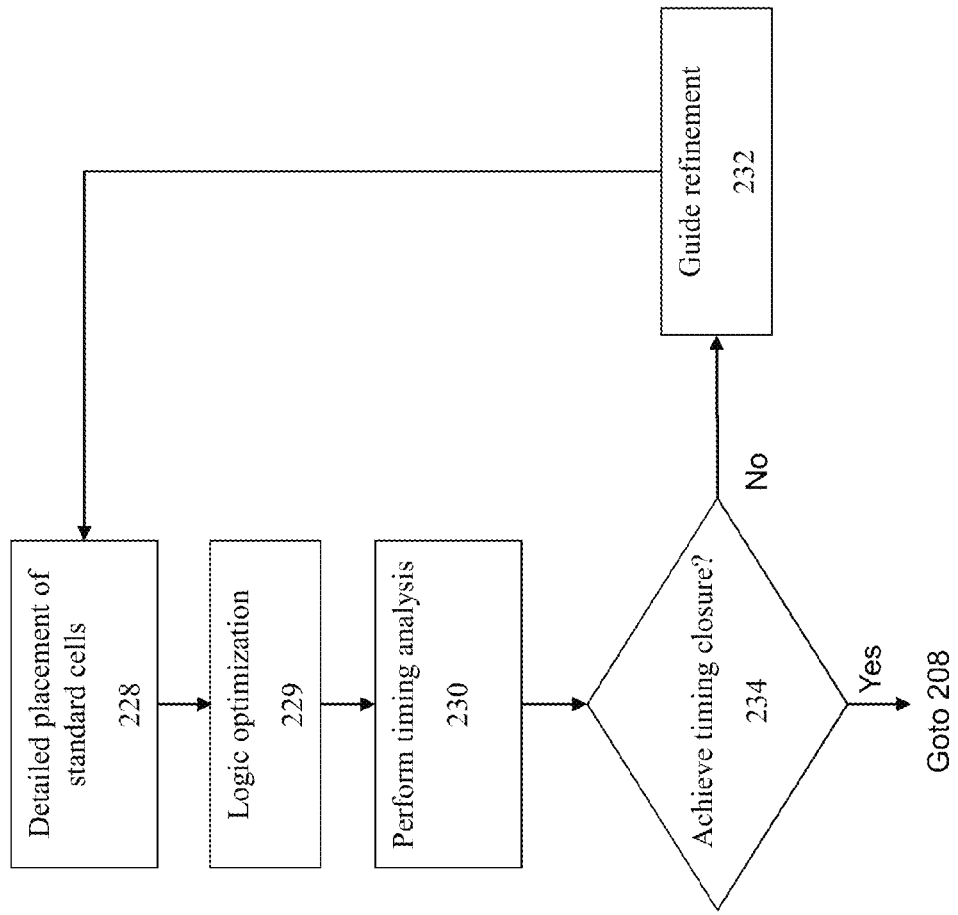

Provided is an improved method, system, and computer program product for implementing flexible abstraction models (also referred to herein as "flexmodels") to perform efficient prototyping of electronic designs, which allows for very efficient analysis of the electronic designs. A flexmodel is an abstraction of a circuit portion that allows for very efficient analysis of electronic designs.

The flexmodel replaces a substantial portion of the internal paths of a circuit portion with a model that significantly reduced in size so that the prototype circuit design is much smaller than the entirety of the original circuit, which allows for very efficient analysis. One way to accomplish this is to remove internal R-to-R (register to register) paths and replace those paths with flexible filler cells, which may be implemented as a type of standard cells having specified connection and behavioral parameters appropriate as nonfunctional filler cells. In this manner, the flex model would remove all internal paths while it maintains paths that extend to input and output ports, the interface paths.

In addition, optimizations can be performed for all (or substantially all) of the interface paths, so that there is confidence at the top level that the models will accurately reflect the best possible timing (and physical characteristics) and so that the designer can analyze if a floorplan can be made such that the circuit design will be acceptable for its intended functionality. This can be implemented by taking all (or at least a substantially large number) of the timing paths, and optimizing those paths, instead of just identifying just a select few critical paths. This can be accomplished by setting the input and output delays for each flex model so that they are extremely small, which essentially means that a negative delay is established for those input/outputs for the models. For each flex model, interface paths are then optimized as much as possible/reasonable to meet these aggressive timing requirements. In this way, there is great confidence that the timing of this model will be as good as it can possibly be, so that when the analysis is performed at the top-level of the design, the remedy is changing the top-level floorplan, and not improving the models. On the other hand, if the timing requirements cannot be met, then this issue can be identified early enough so that the designer can more easily correct the problem. In this way, the invention provides very good visibility into the timing behavior of the circuit design, in a curate manner, at an early stage of the design cycle.

FIG. 1 shows an architecture of a system 100 for implementing hierarchical prototyping according to some embodiments of the invention. System 100 may include one or more users at one or more user stations 102 that operate the system 100 to design, edit, and/or analyze electronic designs. The users at user station 102 correspond to any individual, organization, or other entity that uses system 100 for designing or analyzing an electronic design. Such users include, for example, chip architects, product designers, design engineers, and/or verification engineers. User station 102 comprises any type of computing station that may be used to operate, interface with, or implement EDA tools, applications or devices 130. Examples of such user stations 102 include for example, workstations, personal computers, or remote computing terminals. User station 102 comprises a display device, such as a display monitor, for displaying electronic design layouts and processing results to users at the user station 102. User station 102 also comprises one or more input devices for the user to provide operational control over the activities of system 100, such as a mouse or keyboard to manipulate a pointing object in a graphical user interface.

The user station 102 may be associated with one or more computer readable mediums or storage devices 120 that hold information 122 corresponding to the user's electronic design. Computer readable storage device 120 comprises any combination of hardware and software that allows for ready access to the data that is located at the computer readable storage device 120. For example, computer readable storage device 120 could be implemented as computer memory operatively managed by an operating system. The computer readable storage device 120 could also be implemented as an electronic database system having storage on persistent and/or non-persistent storage.

The electronic design information 122 comprises any set of information or parameters that the user has developed for information relating to an electronic design which can be used to perform hierarchical prototyping and/or analysis of the electronic design. In some embodiments, such information may include, for example, a netlist 104, a floorpan 106, and timing information 118. The netlist 104 may be implemented using any suitable type of design language, such as for example, Verilog or VHDL. In some embodiments, when the invention is applied at an early stage of the design cycle, the floorplan 106 comprises a skeleton floorplan that includes a sufficient amount of information about the floorplan such that analysis and planning can be performed. In other words, the skeleton floorplan does not need to include the extensive level of detail that is present in a final floorplan, but may include a general outline of the location of circuit elements and of the I/O elements. The timing information 118 comprises information from the designer regarding the expected timing behavior of the basic circuit building blocks. In some embodiments, the timing information is contained within a timing file (e.g. a Liberty file or a .lib timing file).

The electronic design information 122 is used as inputs by the prototyping tool 112 to create a prototype 131 of the circuit design having the flexmodels. A timing analysis tool 114 can then utilize the prototype 131 to perform timing analysis to generate analysis results 132. A placement tool 113 and a routing tool 115 can also be used to place and route the prototype 131. The timing analysis can be performed without placement tool 113 and routing 115, or after placement by placement tool 113, or after placement and routing by both the placement tool 113 and the routing tool 115. Optimizations can be performed, based at least in part on the analysis results 132, to optimize the circuit design to meet timing requirements.

FIG. 2A shows a flowchart of an approach for implementing some embodiments of the invention. At 200, flexible models are created for electronic design. This action in some embodiments creates the flexmodels on disk, and then replaces parts of the original netlist with flexmodels that includes macros, interface standard cells, and flexible filler cells, where the flexible filler cells replace a substantial portion of the internal paths of a circuit portion. By replacing internal paths with flexible filler cells, this allows the prototype to be much smaller in size than the original design. Unlike conventional filler cells, flexible filler cells according to some embodiments of the invention include connections. According to some embodiments, the flexible filler cells can be implemented as a type of standard cell so that all the other EDA tools will be able to operate on them. In an alternate embodiment, the flexible filler cells can be implemented as a macro with standard or non-uniform sizes and other parameters.

Figure 3:
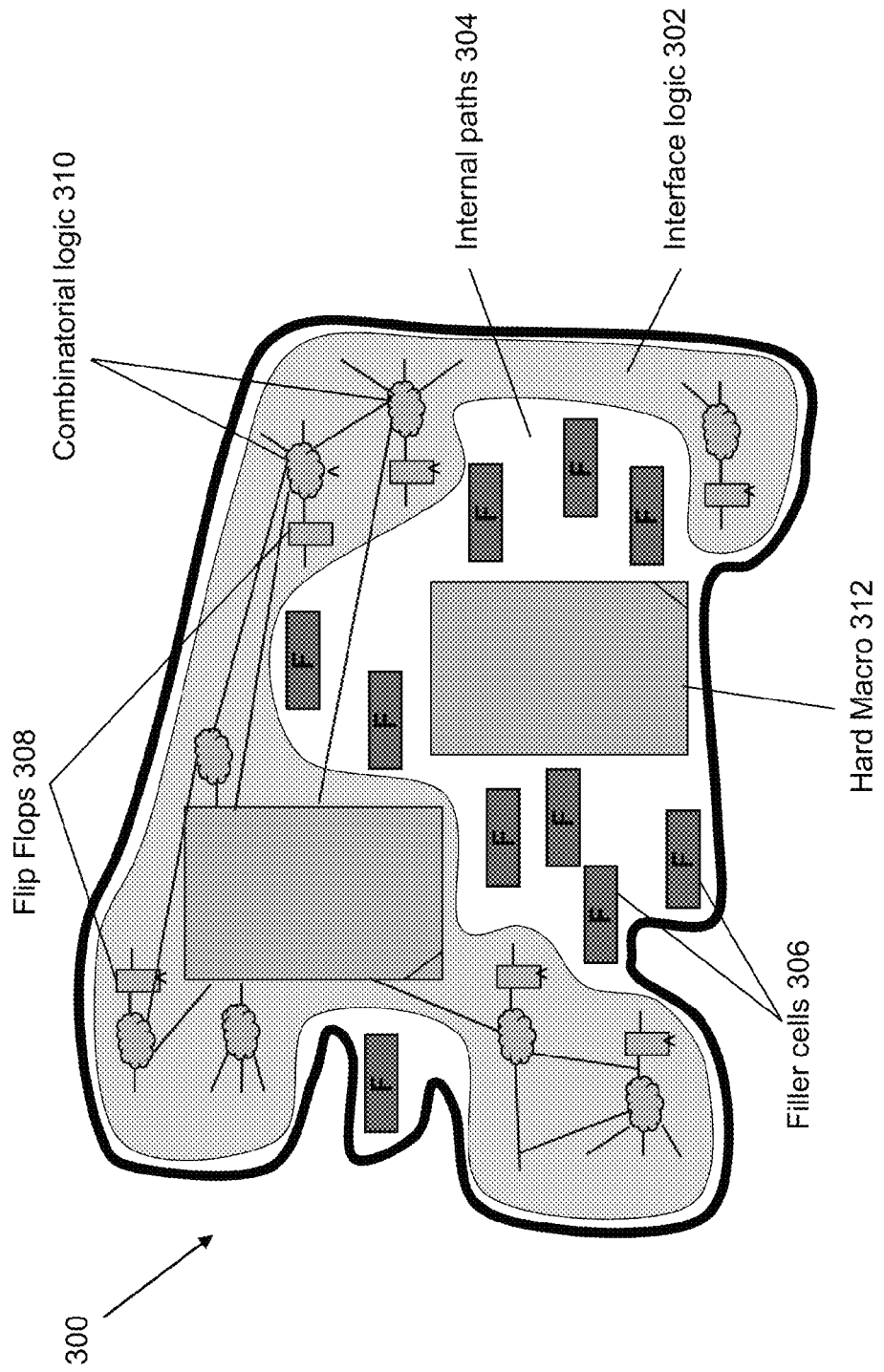
FIG. 3 shows an illustrative flexmodel according to some embodiments of the invention.

FIG. 3 illustrates an example flexmodel 300. flexmodel 300 comprises interface logic portion 302 and internal paths 304. Internal paths 304 comprise, for example, internal R-to-R (register to register) paths that have been replaced with flexible filler cells 306 (which may be referred to herein as "flexfillers"). In some embodiments, the flexible filler cells 306 may be implemented as a type of standard cells having specified connection and behavioral parameters appropriate as nonfunctional filler cells, with a standard number of input/output ports and a standard size. The interface logic portions 302 (e.g., interface standard cells) are retained in the flex model. Thus, structures such as flip flops 308 and combinatorial logic 310 in the interface logic portions 302 are retained in the flex model netlist. In this manner, the flex model would remove all internal paths while maintaining paths that extend to input and output ports. Hard macros and structures (such as memory/hard macro 312) may be retained in their original form in the flex model 300.

In addition, optimizations are performed for all and/or a substantial portion of the interface logic paths 302, so that there is confidence at the top level that the models will accurately reflect the best possible timing (and physical characteristics) so that the designer can analyze if a floorplan can be made such that the circuit design will be acceptable for its intended functionality. This can be implemented by taking all (or at least a substantially large number) of the timing paths, and optimizing those paths, instead of just identifying just a select few critical paths. This can be accomplished by setting the target input and output delays for each flex model so that they are extremely small, which essentially means that a negative delay is established for those input/outputs for the models. Since the target input and output delays for a flexmodel are set to 0, all paths will never be met, but optimization will then see all possible paths as not meeting the goal and so force the optimizer to work on reducing all paths as much as possible. In some embodiments, a setting is made on the optimizer can be set forcing it to optimize all negative paths, and not just the worst percentage (e.g., 20%) of failing (negative) paths, which is the default setting for certain optimizers. Optimizers by default are configured not to waste runtime working on failing paths which when fixed will not improve the worst timing path. For each flexmodel, interface logic paths 302 are then optimized as much as possible/reasonable to meet these design-independent and aggressive timing constraint requirements. In this way the interface delays for each of the flexmodels are as fast as possible, allowing floorplanning at the chip-level with the flexmodels to achieve results that are as fast as possible. This means that timing problems can be detected very quickly since: (a) the analysis can run very fast because of a reduction in the number of standard cells (e.g., 10 times faster because of there are 10 times less standard cells); and (b) only top-level changes are needed for later optimization (e.g., where possible optimizations or changes can include changing locations of flexmodels, optimization of top-level gates), since the interface path timing within the flexmodels (already optimized) cannot be improved or further optimized.

This document will now describe in more detail an approach for creating flex models according to an embodiment of the invention. FIG. 2F shows a flowchart of an illustrative approach to create flexmodels. At 251, the first step is to select the modules in the full netlist that are to be modeled as flexmodels. This can be accomplished in some embodiments by identifying which of the modules corresponds to a threshold number of instances. A directory can be created to store the original netlist of each model.

A threshold number of instances can be identified for automated identification of the modules to be modeled as flexmodels. The threshold can be identified as a percentage of the overall instances in the design. Alternatively, the threshold can be specified as a combination of a minimum/maximum number of instances. For example, assume that a minimum threshold is set at "2 k" (i.e., 2000) and a maximum threshold is set at "5 k". Therefore, when performing a top-down walk though the hierarchy, any module that exceeds the minimum threshold number and is beneath the maximum threshold number would be modeled as a flexmodel. The children of that module would not need to be separately modeled. In addition, an exclusion setting can also be utilized. The "exclusion" designation would explicitly exclude a given module from being modeled as a flexmodel. In some embodiments, this exclusion designation would not apply to that modules children in the hierarchy.

Figure 6:
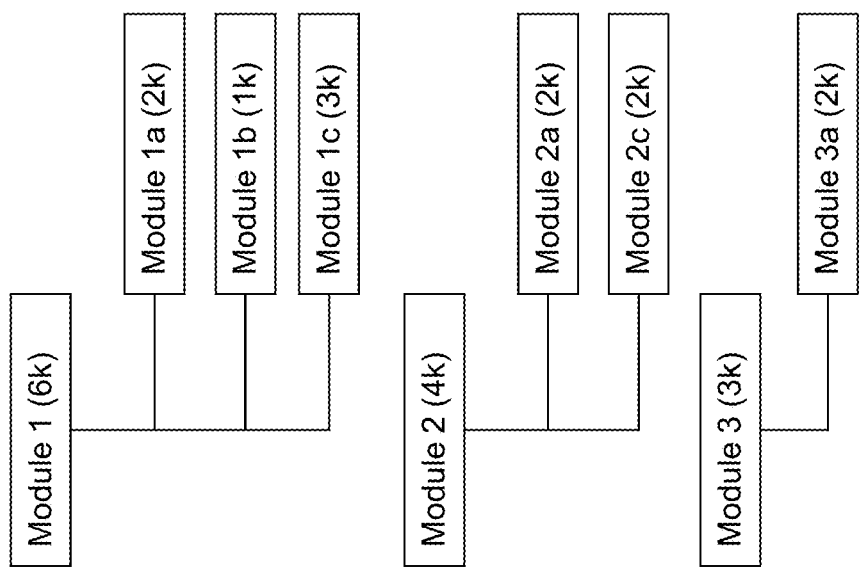
FIG. 6 shows an example modelsource structure according to some embodiments of the invention.

In the example hierarchy of FIG. 6, it can be seen that module 1 falls outside this example min/max range to identify as a flex model, since module 1 has 6 k instances and the min/max range extends from 2 k to 5 k. Therefore, its children will be examined to see if any fall within the specified parameters. Here, child modules 1a (2 k) and 1c (3 k) do fall within the min/max range, and hence would be identified for flexmodels. Module 2 would also be identified to be modeled as a flexmodel, since its instance count (4 k) falls within the specified range. Since module 2 is being identified for modeling as a flexmodel, its children (2a and 2b) would not need to be modeled, since module 2 in its entirety will be modeled. Module 3 would normally be identified as a candidate for a flexmodel, since its instance count (3 k) falls within the specified min/max range. However, module 3 was also specifically designated to be excluded from being a flex model. Therefore, its children will be reviewed to see if any fall within the specified parameters. Here, child module 3a has an instance count of 3 k which falls within the specified min/max range, and hence should be identified as a candidate for a flexmodel. The original full netlist (e.g., a verilog netlist) for each identified module would be stored in the appropriate portion of the model directory.

At 253, the next step is to review each module, and to replace internal paths with flexible filler cells. For example, all internal R-to-R (register-to-register) paths would be replaced with flexfiller cells. On the other hand, any logic that directly connects to an input or output port would not be replaced with flexible filler cells. The number of flexible filler cells is selected to approximate the area of the internal path structures that are being replaced.

Figure 7:
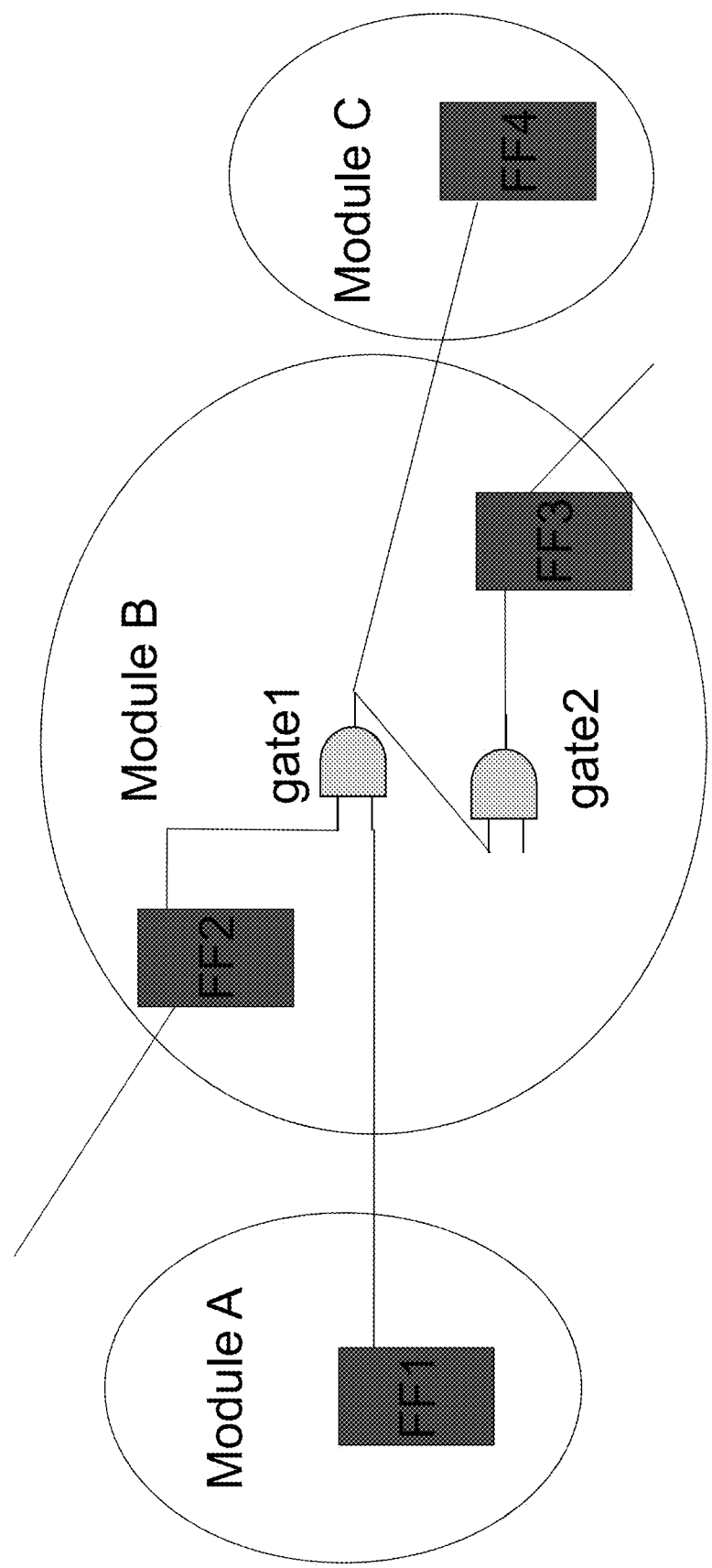
FIG. 7 illustrates an example design portion.

To illustrate, consider the design portion shown in FIG. 7. In this example, Gate1 will be preserved (i.e. part of the flexmodel for ModuleB), since it is in a Register-to-Output path (FF2→gate1→OutPort). Gate2 will also be preserved since it is in an Input-to-Register path (InPort→gate1→gate2→FF3). If FF1 is inside ModuleB, then gate2 would NOT be in flexmodel B (but gate1 would).

Figure 8:
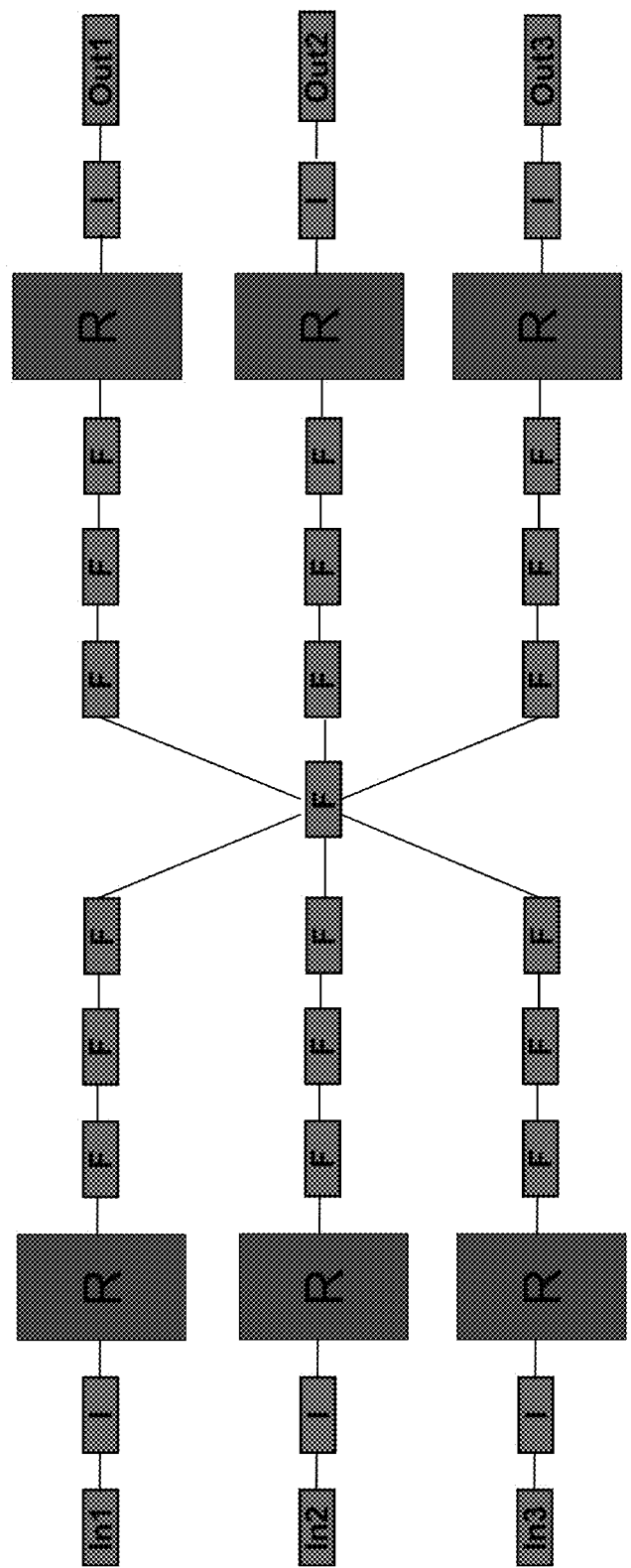
FIGS. 8, 9, and 10 illustrate example flexfiller arrangements according to some embodiments of the invention.

The flexfiller cells can be organized in any suitable manner within the flexmodel. FIG. 8 shows one possible organization of the flexfiller cells ("F") into a star arrangement. In this approach, a central flexfiller cell is used to centrally connect the rest of the flexible filler cells. The advantage of this approach is that the number of nets between flexible filler cells is minimized. In addition, most flexible filler cells can be standardized to include only two ports or terminals. The problem with this approach is that the central flexible filler cell would need to be separately configured in a custom manner to ensure that it has a sufficient number of ports to handle its duties as the central point of the arrangement.

FIG. 8 also shows the flexfiller cells ("F") connected to registers ("R") which in turn are connected to interface logic (I"). The interface logic ("I") are connected or either input ports ("In1", "In2", "In3") or output ports ("Out1", "Out2", "Out3").

Figure 9:
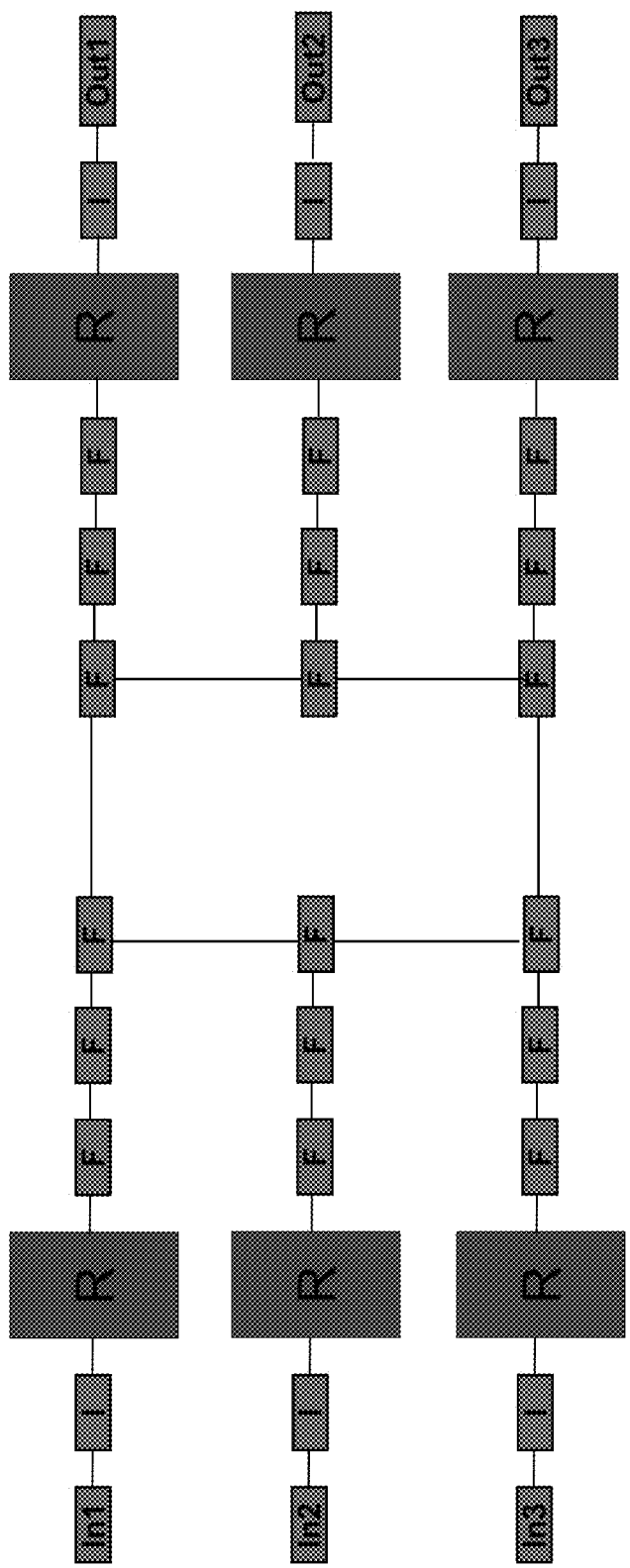

FIG. 9 shows an alternate hub arrangement for the flexible filler cells. The advantage of this approach is that each flexible filler cell ("F") now only needs at most three input/output ports. Therefore, the flexible filler cells ("F) can all be standardized, e.g., every flexible filler cell can be configured to be the same with three ports. However, most of the flexible filler cells would have an excess port, where to the extent a given flexible filler cell only needs to use two ports, the extra port will remain unused. FIG. 9 also shows the flexfiller cells ("F") connected to registers ("R") which in turn are connected to interface logic (I"). The interface logic ("I") are connected or either input ports ("In1", "In2", "In3") or output ports ("Out1", "Out2", "Out3").

Figure 10:
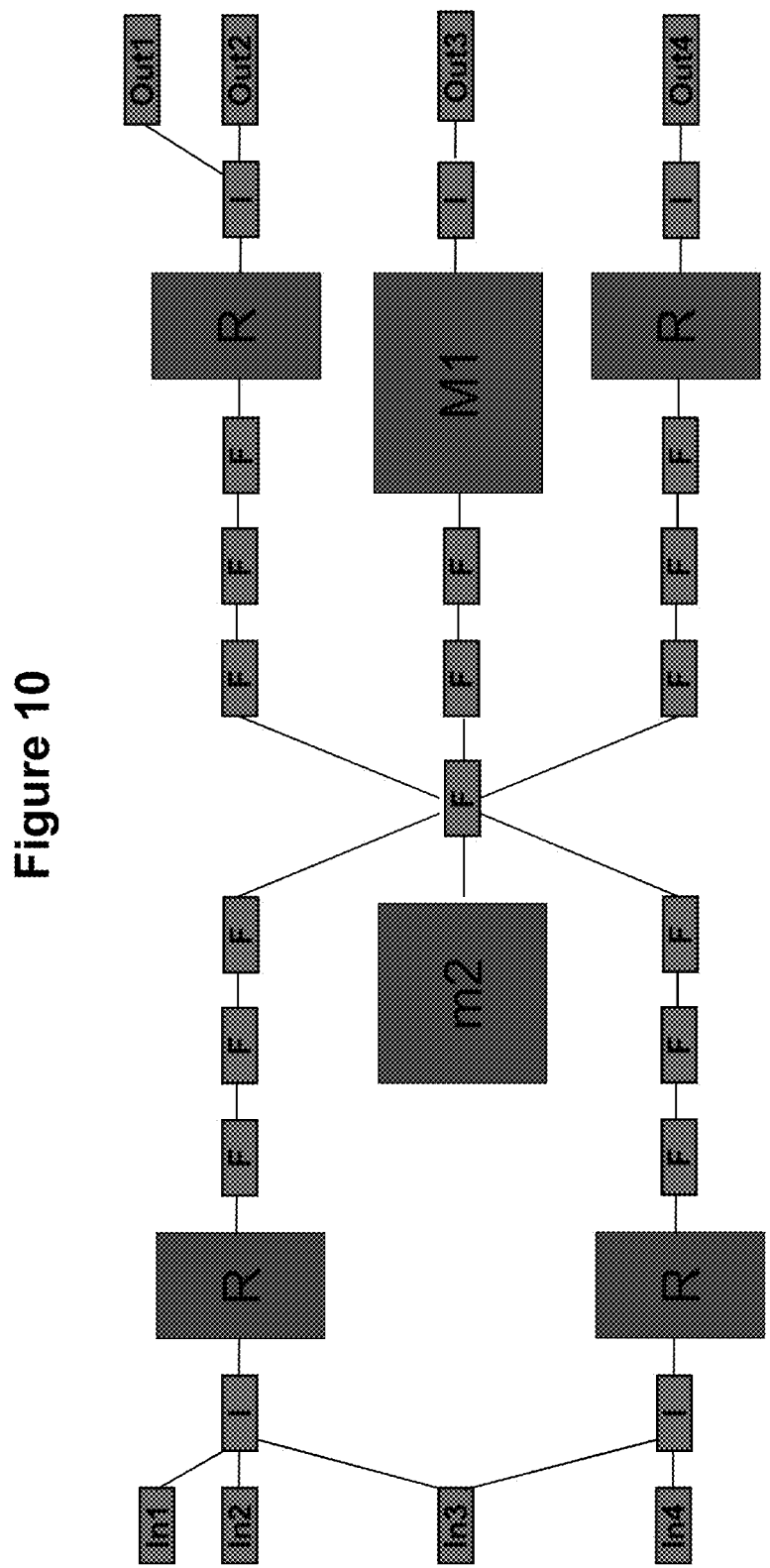

FIG. 10 shows the star arrangement of the flexfiller cells ("F"), which includes a central flexfiller cell that centrally connects the rest of the flexible filler cells. As before, this figure shows flexfiller cells ("F") connected to registers ("R") which in turn are connected to interface logic (I"). In addition, this figure also shows an interface macro ("M1") that connects to an interface logic ("I"). An internal macro ("m2") is shown which only connects to a flexfiller ("F"). In this example, there are also interface logic ("I") which are connected to multiple input ports ("In1", "In2", "In3") or output ports ("Out1", "Out2").

Replacing internal paths with flexfiller cells will tremendously reduce the amount of data that must be analyzed for each module. In many cases, the netlist will be reduced by at least 90 percent just by replacing internal paths with flexible filler cells.

Next, at 256, the timing constraints file (e.g., an "SDC" or "Synopsys Design Constraints" file) for each module is configured so that all interface logic of the flexmodel is fully optimized. In one embodiment, this is accomplished by setting the input and output delays to be equal to the same delay as the clock period that is defined for the clock associated with that port. This essentially gives none of the clock period to the logic within the flex model, since all of the clock period is consumed outside the module.

In some embodiments, a setting is made on the optimizer forcing it to optimize all negative paths, and not just the worst percentage (e.g., 20%) of failing (negative) paths, which is the default setting for certain optimizers. Optimizers by default are configured not to waste runtime working on failing paths which when fixed will not improve the worst timing path. This forces the timing analysis process to optimize every path, no matter how small or short. In this way, the external delays for each of the flexmodels are as fast as possible, allowing floorplanning at the chip-level with the flexmodels to achieve results that are as fast as possible. This means that timing problems can be detected very quickly since: (a) the analysis can run very fast because of a reduction in the number of standard cells (e.g., 10 times faster because of there are 10 times less standard cells); and (b) only top-level changes are needed for later optimization (e.g., where possible optimizations or changes can include changing locations of flexmodels, optimization of top-level gates), since the interface path timing within the flexmodels (already optimized) cannot be improved or further optimized. The advantage of this approach is that since every path is being optimized, this means that very accurate chip-level timing can be achieved. If timing cannot be met between flexmodels, then there are two choices, to either move flexmodels closer together in the floorplan or to give the problem back to the designer at the front end. However, any design that can meet top-level timing requirements using flexmodels which were fully optimized during model creation has a very high likelihood that chip implementation will be able to achieve chip-level timing goals. This is in direct contrast to alternate approaches that selectively identify only a certain percentage of critical paths to analyze, which can result in unpleasant downstream surprises when un-analyzed paths create problems that either cannot be corrected, or can only be corrected by a costly fixes at a late stage of the design cycle.

The optimization, and indeed the total runtime to create a model is very quick since: (1) the full netlist of this model is only a small fraction of the full chip netlist; (2) this fractional netlist has been further reduced (e.g., by another factor of 10) by removing the internal register to register paths; and (3) each model can be created separately on a separate computer in a separate process (e.g., in parallel) and so runtime is linear with the number of computers (e.g. halve the wall-clock runtime for model creation by doubling the number of computers).

At 254, buffer elements may be inserted into the flexmodels to comply with user-driven expectations of certain type of delays. For example, the user may specify certain minimum delay parameters, to account for expected logic to be inserted into the design at a later stage.

After step 254, optionally a fully optimized timing model (e.g., a ".lib" timing model) could be created, and used with other analysis/modeling approaches as its timing model. For example, the fully optimized timing model could be used with a "black box", hard macro, or "black blob" approach of U.S. Pat. No. 7,603,643 as its timing model. Since the interface logic has been fully optimized (from step 256), this timing model can be referred to as a "fully optimized .lib timing model". This would allow the BlockBox, BlackBlob, or hard Macro approaches to obtain some of the benefits of the approach discussed herein, namely: (1) linear wall-clock runtime creation of fully optimized timing model; (2) no need for top-level logic optimization step; and (3) can create timing model once and re-use with many turns of floorplan variations. Of course the flexmodel approach of some embodiments of the invention would still be advantageous over these other approaches that (1) do not provide visibility of child/internal hard macros; (2) do not have has interface pins (other than at the ports) for top (chip-level) timing constraints (e.g., SDC constraints) to reference; and (3) do not provide insight into the placement of interface standard cells, which allows for more visibility into congestion and connectivity-based placement decisions.

Returning back to FIG. 2A, the next action 202 is to create a floorplan for the circuit prototype, which will provide placement of the flex models onto a floorplan as "guides", which is a combination of a rectilinear shape and location that suggests or provides a soft constraint for a boundary of the flexmodel contents. This action essentially provides the initial placements of flex model guides onto a floorplan. FIG. 2B shows a flowchart of an illustrative approach for creating a floorplan. At 210, the flex model guides are shaped and placed onto the floorplan. In some embodiments, this is a process of serially going through the various flex model guides in the design, and placing the flex model guides in locations on the floorplan so that heavily connected flex model guides are placed closer together. To the extent there are overlaps, the flex model guides may be re-shaped to avoid the overlaps, e.g., by changing or stretching the width/height of the flex model guides to maintain equivalent area while minimizing overlaps with other flex model guides.

Figure 4:
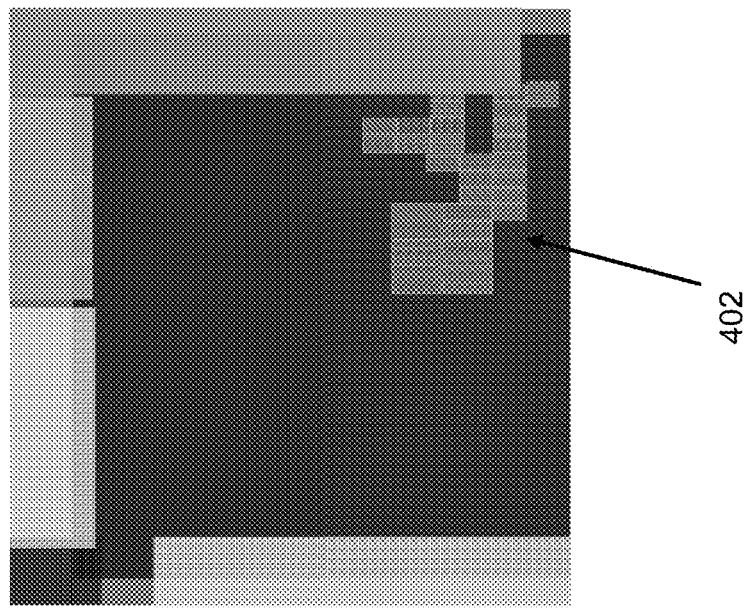
FIG. 4 illustrates a floorplan that has been created with flexmodels according to some embodiments of the invention.

The flexmodels can intermingle with other flexmodels and standard cells, with guides provided onto the floorplan as controls over the extent of the intermingling. At 212, the hard macros 312, 402 of the flexmodel will also be placed onto the floorplan, e.g., as shown in FIG. 4. The hard macros therefore provides limitations over the ability of the flex models to change its shape, since the flex model shape must be able to accommodate the shapes of the hard macros that are within those flex models.

The next action 204 in the flowchart of FIG. 2A is to verify the feasibility of the floorplan created in step 202. FIG. 2C shows a flowchart of an illustrative approach for verifying feasibility of the floorplan. At 222, guide refinement may be performed, e.g., to change the shape and/or location of the guides. The guide refinement activity may be performed for any appropriate reason, e.g., to achieve timing closure as discussed in more detail below.

At 220, timing analysis is performed to check whether the timing requirements can be met with the current floorplan design. The timing analysis is a virtual timer, which assumes zero wire and pin delay for the standard cells, and applies a user given ps_per_micron to long wires, which eliminates the need for calling logic optimization to reduce delay along a long net by adding buffers. The virtual timer, along with fully optimized flexmodels, can eliminate the need for calling logic optimization, a step which normally needs relatively large amount of runtime and memory. Since all interface path delays for the flexmodel have been minimized as much as possible, the top-level designer does not have to re-create the flexmodels due to floorplan changes, and knows that the only way to reduce a failing timing path between two flexmodels is to place them near each other.

Because there is a minimal level of detail at this stage (e.g., because internal paths have been replaced with flexfiller cells), the timing analysis can be performed extremely quickly. For example, consider timing with respect to standard cells. At this stage, standard cells do not necessarily need to be in a precise location within the flexmodel. Therefore, instead of cluttering up the design with specific placement locations for standard cells, one can "assume" the location of the standard cell at the center of the flexmodel. From a timing analysis perspective, a path from a first standard cell in a first flexmodel to a second standard cell in a second flex model can be assumed to travel a path from the center of the first flexmodel to the center of the second flexmodel.

Automatic creation of timing categories between two flexmodels can be implemented for the timing analysis. In addition, from a user interface perspective, only the top path of each category can be visually shown, so that a large number of paths between two flexmodels are coalesced into a much smaller number of paths, allowing a "big picture" view of timing to be seen at a single glance.

A determination is made at 224 whether timing requirements can be met by the current shape/positioning of the flex model guides. If not, then the above actions can be repeated as needed until timing goals are met. For example, the process may return back to 222 to perform guide refinement as necessary to accomplish the timing goals of the design. This can be a manual action taken by the user to adjust the location and other parameters of the flexmodel guides. Alternatively, guides can be automatically adjusted to achieve desired timing optimizations goals.

Figure 5:
FIG. 5 illustrates a more detailed floorplan that has been created with flexmodels with realistic standard cell information according to some embodiments of the invention.

The next action 206 of FIG. 2A is to implement and verify a more detailed placement onto the floorplan. This step honors the guide placement from the previous step, but provides for a more realistic placement of features of the design. FIG. 2D shows a flowchart of an illustrative approach to implement and verify a more detailed placement onto the floorplan. For example, at 228, flexfillers and standard cell assignments can be configured to force a more realistic placement of interface standard cells in the design. FIG. 5 shows an example of the floorplan of FIG. 4, which has been modified to more realistically account for placement of flexible filler cells and standard cells.

Logic optimizations may be performed at 229. It is noted that by this point, the interface logic paths have already been optimized within the flexmodel as much as possible to meet timing these design-independent and aggressive requirements as discussed above. As such, the external delays for each of the flexmodels are as fast as possible, allowing floorplanning at the chip-level with the flexmodels to achieve results that are as fast as possible. Therefore, one of the benefits of using flex models (which have their interface paths fully optimized) along with a virtual timer (as discussed above), is that for most chip designs there is no longer a need to perform optimization at 229, where in the conventional approaches this step is needed. As noted above, since the flexmodels are created with all of its IO paths optimized to be as fast as possible, even short paths are optimized. The flexmodels eliminates the need to re-spin models with different budgets and the models only need to be created once, and then can be used for many turns of the floorplan (e.g. the process in shown in FIG. 2C and FIG. 2D). As such, no top-level optimization is usually needed and optimization only done once during model creation. This allows for very small runtime since only interface logic of a model is optimized and the runtime scales linearly with the number of hosts (double the hosts, halve the wall clock time). Without flexmodels, conventional approaches would perform optimization after every floorplan change. Therefore, with full optimization during model creation, there is no optimization needed at the top level using flex models. In addition, if there is no optimization during model creation, then logic optimization will be required after every step at the top level (In this case the model's netlist is not static as in the previous case).

It is also possible that optimizations outside of the flexmodel may be needed at 229 to accomplish one or more design goals or timing requirements. For example, such optimizations may include optimization of top-level gates.

Timing analysis is performed again at 230. A determination is made at 234 whether timing requirements can be met by the current shape/positioning of the flex model guides. If not, then guide refinement may be performed as needed at 232 to optimize timing for the design. The previous actions are repeated as needed until the circuit design has been optimized as best as possible or to an otherwise acceptable state, e.g., until timing closure is achieved. As noted above, with fully optimized flexmodels, the logic optimization step is usually not required.

It is noted that timing analysis for step 206 has to account for much more design details (e.g., because of more detailed placement information for standard cells) than the timing analysis that was performed in step 204. As a result, more time and computing resources may be needed to perform the timing analysis for step 206. However, the faster iterations within step 204 will reduce the number of iterations of slower step 206 and overall save time. Note that both steps are fast compared to prior approaches since they both taking advantage of flexmodel technology.

Figure 2E:
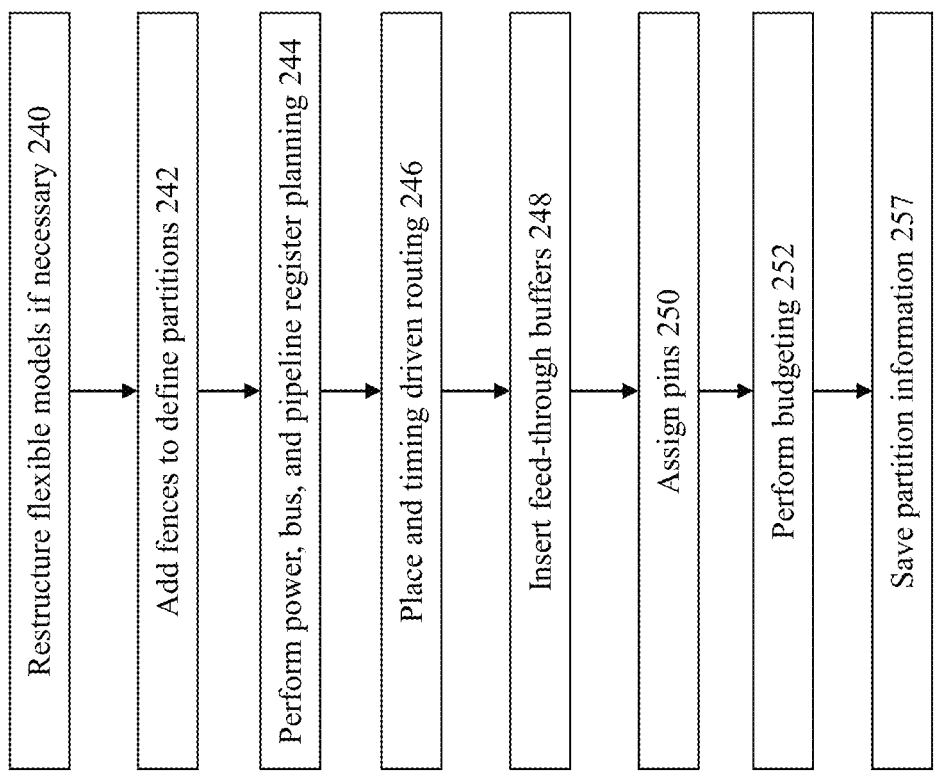
Figure 2F:
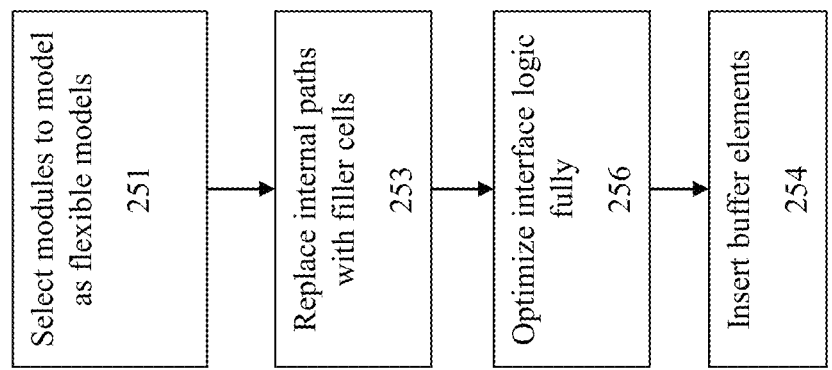

Once timing closure has been achieved, then the next action 208 of FIG. 2A is to define partitions in the floorplan. FIG. 2E shows a flowchart of an illustrative approach to define partitions in the floorplan. At 240, the flexmodels are checked for continuity, and the models within an existing parent may be moved to maintain continuity for the defined partitions, or if they are too discontinuous, the top-level netlist may be restructured. In some embodiments, this action is performed manually by visually checking for continuity. In alternative approaches, this action is automatically performed to adjust flexmodels to maintain continuity.

At 242, fences are added to the design to define the physical boundaries of the partitions for the logical hierarchy. At 244, power, bus, and pipeline planning may also be performed at this stage. Placement and timing-driven routing may be performed at 246 for the floorplan. At 248, feed-through buffers are defined if necessary to maintain timing. Pins are also assigned at this stage at 250. Budgeting, using the flexmodels, can be performed for the design at 252. Once the partitions have been defined and saved at 257, block implementations and post assembly closure can then be performed.

As noted above, the flexmodels of embodiments of the invention may be used in the context of both timing and physical placement analysis. In addition, the flexmodels can be used for congestion analysis as well. Since there are many less standard cells using embodiments of the invention (e.g., 10× less stdcells), this means that there are many less nets (e.g., 10× less nets), and therefore much less congestion (e.g., 10× less congestion). It is noted that the congestion may not correlate well with the full netlist. The congestion can be modeled by reserving routing tracks to correlate with routing tracks which would have been used by a flexmodel's internal register to register nets. There are several approaches that can be taken to implement this functionality. One approach is to globally block a percentage of routing tracks per routing layer. However this approach may unfairly penalize areas which are not part of flexmodels. Alternatively, one can locally block routing tracks within flexible models by using a model (e.g., a LEF model) for flexible fillers which has OBS obstruction statements which block a percentage of routing resources. Another approach would be for the router to recognize the flex fillers, and add routing blockages over the flexfillers just before routing.

Therefore, what has been described is an improved approach for implementing flexible model and performing analysis using those models. This approach provides numerous benefits to electronic designers. First and foremost, the present approach using flexmodels can significantly reduce the instance count of the prototype, e.g., to less than 10 percent of the full-netlist. This level of reduction in instance count can greatly speed up the run time for the analysis process.

In addition, the present approach provides a very accurate way to perform timing analysis at an early stage of the design cycle, but still have great confidence that timing requirements will be met at the top level of the design, even later in the design cycle. This is because the flexmodel is created with all of its I/O paths optimized to be as fast as possible, so that even short paths are optimized. As a result, no top-level logic optimization is needed and optimization only needs to happen once—when models are created. Another advantage is that models only need to be created once, and can then be used for many turns of the floorplan. This eliminates re-spin of models with different budgets.

For example, as compared to approaches that utilize a flat model of the design, the present invention provides a tremendous amount of performance improvement. This is because the present embodiment allows for faster processing because it reduces the number of instances that need to be processed by any of the tools, (i.e. timing analysis, placement, etc.), and also correspondingly requires much less memory to perform analysis of the circuit design. Moreover, the present embodiment only needs to optimize the interface standard cells during model creation rather than optimizing the full design for each change in the floorplan like the traditional flat approach.

System Architecture Overview

Figure 11:
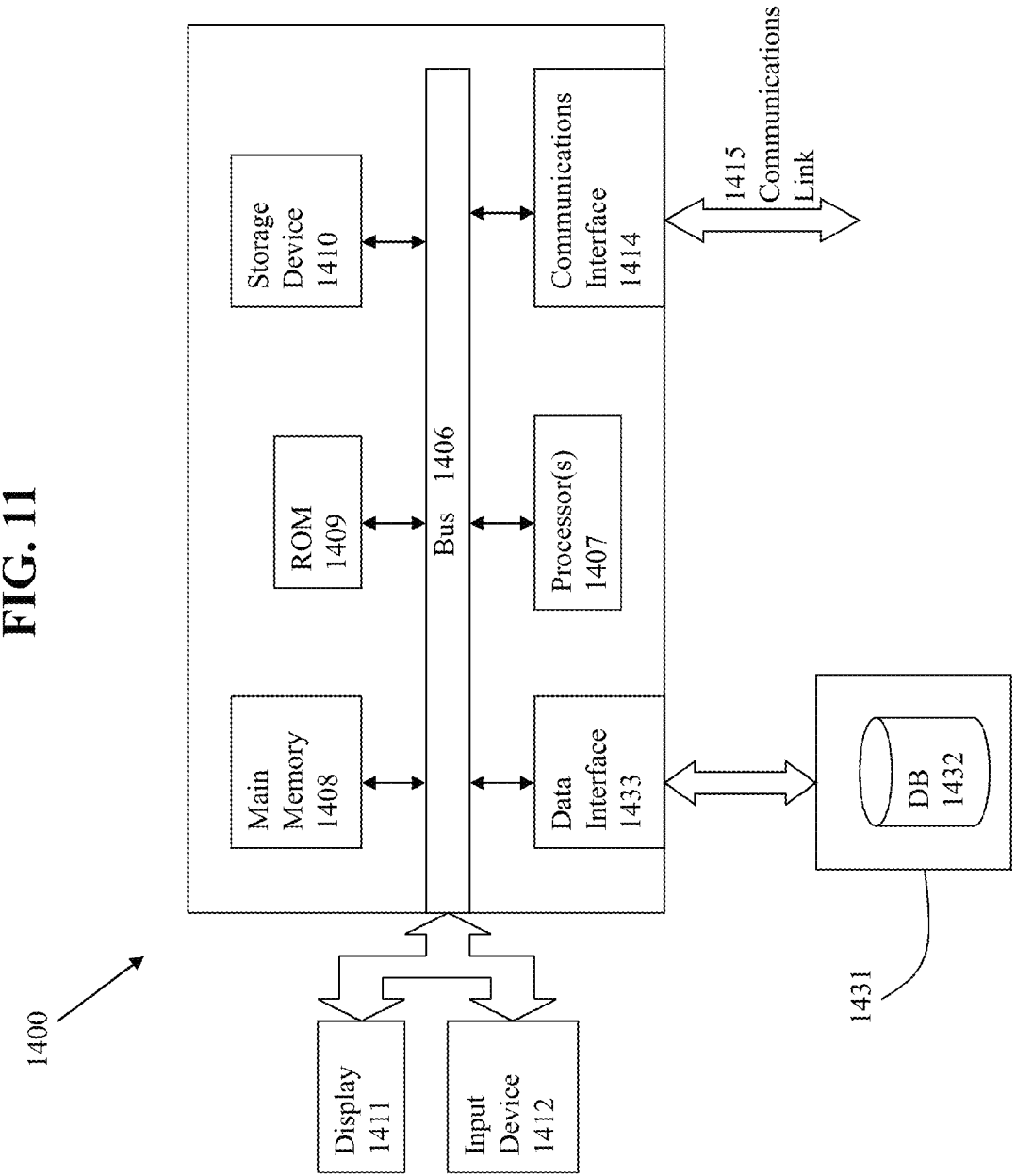
FIG. 11 shows an architecture of an example computing system with which the invention may be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing an electronic design, comprising:
    using a processor to prototype a portion of the electronic design with a flexible model,
    replacing internal paths in the flexible model with filler content comprising a plurality of filler cells, wherein the filler cells are configured to approximate an area of one or more structures on the internal paths; and
    retaining, within the flexible model, interface logic portions of the portion of the electronic design.

2. The method of claim 1, further comprising:
configuring a floorplan that includes the flexible model;
verifying feasibility of the floorplan;
providing a more detailed floorplan and verifying feasibility of the more detailed floorplan; and
defining partitions for the more detailed floorplan.

3. The method of claim 2, in which the floorplan is configured by a process comprising:
shaping and positioning a guide corresponding to the flexible model;
placing hard macros within the flexible model.

4. The method of claim 2, in which feasibility of the floorplan is verified by a process comprising:
performing timing analysis; and
performing guide refinement.

5. The method of claim 2, in which the more detailed floorplan is verified for feasibility by a process comprising:
honoring guide placement for the floorplan;
providing detailed placement for standard cells;
performing timing analysis; and
performing guide refinement.

6. The method of claim 2, in which partitions are defined by performing at least one of top-level netlist restructuring, fence addition, performing power, bus, and pipeline register planning, place and timing driven routing, insertion of buffers, pin assignment, or budgeting.

7. The method of claim 1, in which the flexible model is created by a process comprising:
selecting a module from a netlist to model as the flexible model;
replacing the internal paths with flexible filler cells;
configuring timing for the flexible model so that the interface paths for the flexible model are the negative paths; and
performing budgeting for the flexible model.

8. The method of claim 7 in which the internal paths replaced with flexible filler cells comprises register to register paths.

9. The method of claim 7 in which paths between a register and an input or output port is not replaced with the flexible filler cells.

10. The method of claim 7 in which modules that meet a threshold number of instances are selected to prototype with the flexible models.

11. The method of claim 7 in which timing for the flexible model is configured by setting input and output delays to be a low time value.

12. The method of claim 1 in which the filler content is arranged in a star arrangement or a hub arrangement.

13. The method of claim 1 further comprising optimizing interface logic for the flexible model.

14. The method of claim 1 further comprising performing timing analysis, congestion analysis, or physical placement on the portion of the electronic design having the flexible model.

15. A computer program product embodied on a non-transitory computer readable medium, the computer readable medium having stored thereon a sequence of instructions which, when executed by a processor causes the processor to execute method for implementing an electronic design, the method comprising:
using a processor to prototype a portion of the electronic design with a flexible model,
replacing internal paths in the flexible model with filler content comprising a plurality of filler cells, wherein the filler cells are configured to approximate an area of one or more structures on the internal paths; and
retaining, within the flexible model, interface logic portions of the portion of the electronic design.

16. The computer program product of claim 15, the method further comprising:
configuring a floorplan that includes the flexible model;
verifying feasibility of the floorplan;
providing a more detailed floorplan and verifying feasibility of the more detailed floorplan; and
defining partitions for the more detailed floorplan.

17. The computer program product of claim 16, in which the floorplan is configured by a process comprising:
shaping and positioning a guide corresponding to the flexible model;
placing hard macros within the flexible model.

18. The computer program product of claim 15, in which the flexible model is created by a process comprising:
selecting a module from a netlist to model as the flexible model;
replacing the internal paths with flexible filler cells;
configuring timing for the flexible model so that the interface paths for the flexible model are the negative paths; and
performing budgeting for the flexible model.

19. The computer program product of claim 15 in which the internal paths that are replaced with flexible filler cells comprise register to register paths.

20. The computer program product of claim 15 in which paths between a register and an input or output port is not replaced with the flexible filler cells.

21. The computer program product of claim 15 in which timing for the flexible model is configured by setting input and output delays to be a low time value.

22. The computer program product of claim 15 in which the filler content is arranged in a star arrangement or a hub arrangement.

23. The computer program product of claim 15 further comprising performing timing analysis, congestion analysis, or physical placement on the portion of the electronic design having the flexible model.

24. The computer program product of claim 15 further comprising optimizing interface logic for the flexible model.

25. A system for implementing an electronic design, comprising:
a processor;
a memory for holding programmable code; and
wherein the programmable code includes instructions for prototyping a portion of the electronic design with a flexible model, replacing internal paths in the flexible model with filler content comprising a plurality of filler cells, wherein the filler cells are configured to approximate an area of one or more structures on the internal paths, and retaining, within the flexible model, interface logic portions of the portion of the electronic design.

26. The system of claim 25, in which the programmable code includes instructions for configuring a floorplan that includes the flexible model, verifying feasibility of the floorplan, providing a more detailed floorplan and verifying feasibility of the more detailed floorplan, and defining partitions for the more detailed floorplan.

27. The system of claim 26, in which the floorplan is configured by programmable code that includes instructions comprising:
shaping and positioning a guide corresponding to the flexible model;
placing hard macros within the flexible model.

28. The system of claim 26, in which the flexible model is created by programmable code that includes instructions comprising:
- selecting a module from a netlist to model as the flexible model;
- replacing the internal paths with flexible filler cells;
- configuring timing for the flexible model so that the interface paths for the flexible model are the negative paths; and
- performing budgeting for the flexible model.

29. The system of claim 25 in which the internal paths that are replaced with flexible filler cells comprise register to register paths.

30. The system of claim 25 in which paths between a register and an input or output port are not replaced with the flexible filler cells.

31. The system of claim 25 in which timing for the flexible model is configured by setting input and output delays to be a low time value.

32. The system of claim 25 in which the filler content is arranged in a star arrangement or a hub arrangement.

33. The system of claim 25 in which the programmable code further comprises instructions for performing timing analysis, congestion analysis, or physical placement on the portion of the electronic design having the flexible model.

34. The system of claim 25 in which the programmable code further comprises instructions for optimizing interface logic for the flexible model.

35. A method for implementing a timing model for an electronic design, comprising:
- using a processor to generate a timing model for a portion of the electronic design, wherein the timing model includes internal paths replaced with filler content and wherein interface logic of the portion of the electronic design are retained within the timing model;
- fully optimizing, within the timing model, the interface logic; and
- utilizing the timing model having the fully optimized interface logic to analyze the electronic design.

36. The method of claim 35 in which all timing paths are optimized and not just selected critical paths are optimized.

37. The method of claim 36 in which input and output delays are set to small values so that a negative delay is established for input and outputs.

38. The method of claim 37 in which optimizing of the interface logic is performed to address the negative delay for the inputs and outputs.

39. The method of claim 35 in which timing closure is performed by modifying a top-level floorplan.

40. The method of claim 35 in which the timing model is a flexible model.

* * * * *